(12) United States Patent
Zalich et al.

(10) Patent No.: US 8,791,223 B2
(45) Date of Patent: Jul. 29, 2014

(54) CURABLE COMPOSITIONS AND METHODS OF CATALYZING CHEMICAL REACTIONS

(75) Inventors: Michael Zalich, Pittsburgh, PA (US); Mark P. Bowman, New Kensington, PA (US); Jonathan T. Martz, Glenshaw, PA (US); Stephen John Thomas, Aspinwall, PA (US); Gregory J. McCollum, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 314 days.

(21) Appl. No.: 12/900,520

(22) Filed: Oct. 8, 2010

(65) Prior Publication Data

US 2012/0088895 A1 Apr. 12, 2012

(51) Int. Cl.
*C08G 18/16* (2006.01)
*C08G 18/24* (2006.01)
*C07C 269/02* (2006.01)

(52) U.S. Cl.
USPC ............... 528/51; 528/58; 560/24; 560/25; 560/115; 560/157; 560/158

(58) Field of Classification Search
USPC ............ 528/51, 286, 368, 378, 58; 560/1, 24, 560/33, 115, 157, 165, 25, 158; 564/32
See application file for complete search history.

(56) References Cited

U.S. PATENT DOCUMENTS

| | | | | |
|---|---|---|---|---|
| 2,933,477 A | * | 4/1960 | Hostettler | 525/418 |
| 2,933,478 A | * | 4/1960 | Young et al. | 525/418 |
| 3,489,744 A | * | 1/1970 | Schwarcz et al. | 540/202 |
| 3,718,611 A | * | 2/1973 | Maxey et al. | 521/88 |
| 4,021,381 A | | 5/1977 | Christensen | |
| 4,413,079 A | | 11/1983 | Disteldorf et al. | |
| 4,542,165 A | * | 9/1985 | Kumata et al. | 521/137 |
| 4,804,730 A | * | 2/1989 | Ogata | 528/286 |
| 5,354,834 A | | 10/1994 | Yoshida et al. | |
| 5,370,908 A | | 12/1994 | O'Connor et al. | |
| 5,548,057 A | | 8/1996 | Hirayama et al. | |
| 6,444,778 B1 | * | 9/2002 | Laas et al. | 528/61 |
| 6,525,161 B1 | * | 2/2003 | Hall | 528/49 |
| 6,635,736 B2 | | 10/2003 | Van Dijk et al. | |
| 6,897,264 B2 | | 5/2005 | Lachowicz et al. | |
| 7,381,785 B2 | | 6/2008 | Detrembleur et al. | |
| 7,385,016 B2 | | 6/2008 | Lachowicz et al. | |
| 2006/0094804 A1 | | 5/2006 | Lachowicz et al. | |
| 2009/0258962 A1 | | 10/2009 | Martz et al. | |
| 2009/0280329 A1 | | 11/2009 | Rukavina et al. | |
| 2010/0068393 A1 | | 3/2010 | Bowman | |
| 2010/0204388 A1 | * | 8/2010 | Marsh et al. | 524/513 |
| 2011/0229645 A1 | | 9/2011 | Shaffer et al. | |

FOREIGN PATENT DOCUMENTS

| | | |
|---|---|---|
| EP | 0068454 A1 | 1/1983 |
| EP | 0640634 A2 | 3/1995 |
| WO | 2009/126449 A2 | 10/2009 |
| WO | 2010/030771 A1 | 3/2010 |
| WO | 2011/115669 A2 | 9/2011 |

OTHER PUBLICATIONS

Justin W. Chan, Bing Yu, Charles E. Hoyle and Andrew B. Lowe; Convergent synthesis of 3-arm star polymers from RAFT-prepared poly(N,N-diethylacrylamide) via a thiol-ene click reaction; www.rsc.org/chemcomm; Chem. Commun., 2008, pp. 4959-4961.

Justin W. Chan, Charles E. Hoyle and Andrew B. Lowe; Sequential Phosphine-Catalyzed, Nucleophilic Thiol-Ene/Radical-Mediated Thiol-Yne Reactions and the Facile Orthogonal Synthesis of Polyfunctional Materials; J. Am. Chem. Soc. 2009, 131, pp. 5751-5753.

Ian C. Stewart, Robert G. Bergman and F. Dean Toste; Phosphine-Catalyzed Hydration and Hydroalkoxylation of Activated Olefins: Use of a Strong Nucleophile to Generate a Strong Base; J. Am. Chem. Soc. 2003, 125, pp. 8696-8697.

* cited by examiner

*Primary Examiner* — Rabon Sergent
(74) *Attorney, Agent, or Firm* — Krisanne Shideler

(57) ABSTRACT

Methods of catalyzing chemical reactions are provided. A tri-substituted phosphine having at least one substituent that is an alkyl group is added as a catalyst to reaction mixtures. Reaction mixtures contain uretdiones, anhydrides, or isocyanate functional materials including isocyanurates, in various combinations with hydroxyl, thiol, and/or amine functional materials. Curable compositions comprising these catalysts and reaction mixtures are also provided.

12 Claims, No Drawings

CURABLE COMPOSITIONS AND METHODS OF CATALYZING CHEMICAL REACTIONS

FIELD OF THE INVENTION

The present invention is directed to methods of catalyzing chemical reactions and to curable compositions.

BACKGROUND OF THE INVENTION

Catalysis is a change in the rate of a chemical reaction due to the participation of a material called a catalyst. Catalysts that speed the reaction are called positive catalysts. Catalysts that slow the reaction are called negative catalysts, or inhibitors. Unlike reactants, a catalyst is not consumed by the reaction itself.

A catalyst works by providing an alternative reaction pathway to the reaction product. The rate of the reaction is increased when this alternative route has a lower activation energy than the reaction route not mediated by the catalyst. Catalysts can also enable reactions that would otherwise be blocked or slowed by a kinetic barrier. The catalyst may increase reaction rate or selectivity, or enable the reaction at lower temperatures. As such, catalysts can be very valuable tools in industrial processes.

There can be drawbacks to the use of catalysts. For example, highly basic amines such as 1,8-Diazabicyclo-undec-7-ene (DBU) and Barton's base are among the most effective for uretdione/polyol catalysis. However, they are expensive and may contribute to an undesirable yellowing of the reaction product. In another example, tin compounds are used extensively in industrial products such as coatings, as catalysts for isocyanate/hydroxyl reactions. Because of concerns regarding the aquatic toxicity of some organotin compounds, there have been proposed regulations to ban organotin compounds from all coating applications.

It would be desirable to catalyze chemical reactions using methods and catalysts that overcome the drawbacks of the prior art.

SUMMARY OF THE INVENTION

In accordance with the present invention, methods of catalyzing chemical reactions are provided. In one embodiment, a method includes adding a catalyst to a reaction mixture. The catalyst comprises a tri-substituted phosphine having at least one substituent that is an alkyl group, and the reaction mixture comprises:
  i) a) an isocyanate-functional material and b) a thiol- and/or amine-functional material;
  ii) a) a uretdione and b) a hydroxyl-, thiol- and/or amine-functional material; or
  iii) a) an anhydride and b) a hydroxyl-functional material.

In another embodiment of the present invention, a method of catalyzing a chemical reaction is provided, comprising adding a catalyst to a reaction mixture, wherein the catalyst comprises a tri-substituted phosphine having at least one substituent that is an alkyl group, and wherein the reaction mixture is essentially free of Michael acceptors and the reaction mixture comprises:
  i) an isocyanate-functional material that is essentially free of oxadiazinetrione rings; and
  ii) a hydroxyl-functional material.

An additional embodiment comprises adding a catalyst to a reaction mixture, wherein the catalyst is essentially free of tin compounds and comprises a tri-substituted phosphine having at least one substituent that is an alkyl group, and the reaction mixture is essentially free of Michael acceptors and tin compounds, and the reaction mixture comprises:
  i) an isocyanate-functional material; and
  ii) a hydroxyl-functional material.

The present invention also provides curable compositions. Examples include
  a) a reaction mixture comprising:
    i) a) a polyisocyanate and b) a polythiol and/or a polyamine;
    ii) a) a uretdione and b) a polyol, a polythiol and/or a polyamine; or
    iii) a) an anhydride and b) a polyol; and
  b) a catalyst comprising a tri-substituted phosphine having at least one substituent that is an alkyl group.

In a separate embodiment, the curable composition comprises a) a reaction mixture comprising:
  i) a polyisocyanate; and
  ii) a polyol; and
  b) a catalyst comprising a tri-substituted phosphine having at least one substituent that is an alkyl group; wherein the polyisocyanate is essentially free of oxadiazinetrione rings, and the reaction mixture is essentially free of Michael acceptors.

In another embodiment, the curable composition comprises a) a reaction mixture comprising:
  i) a polyisocyanate; and
  ii) a polyol; and
  b) a catalyst, wherein the catalyst is essentially free of tin compounds and comprises a tri-substituted phosphine having at least one substituent that is an alkyl group, and the reaction mixture is essentially free of Michael acceptors and tin compounds.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about," even if the term does not expressly appear. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

Plural encompasses singular and vice versa; e.g., the singular forms "a," "an," and "the" include plural referents unless expressly and unequivocally limited to one referent.

For example, where the invention has been described in terms of "a" polyisocyanate, a plurality, including a mixture of such compounds, can be used.

As used herein, the term "polymer" is meant to refer to prepolymers, oligomers and both homopolymers and copolymers; the prefix "poly" refers to two or more.

The method of the present invention comprises adding a catalyst to a reaction mixture, forming a curable composition when the reactants are polyfunctional. The present invention is also drawn to curable compositions. The catalyst comprises a tri-substituted phosphine having at least one substituent that is an alkyl group. The other substituents on the phosphine may be any combination of aryl and/or alkyl groups. For example, two substituents on the phosphine may be alkyl groups having four or more carbon atoms, often six or more carbon atoms, and one substituent may be an aryl group. Alternatively, all three substituents may be alkyl groups, such as alkyl groups having six or more carbon atoms. In particular embodiments of the present invention, trioctyl phosphine is used as the catalyst.

Under certain conditions it may be desirable to react the tri-substituted phosphine with an acid, typically an organic acid, prior to adding it to the reaction mixture. This "blocking" of the phosphine renders it more stable in air and allows for more precise control over the catalyzed reaction. Any acid may be suitable, but volatile organic acids having 1 to 8 carbon atoms, such as acetic acid and propionic acid, are used most often.

In the methods of the present invention, adding the catalyst to the reaction mixture may cause the reaction to proceed at a temperature lower than would be required without the use of the catalyst. Also, the reaction may occur faster at a given temperature than would otherwise be observed between the particular reactants. Reactions may be conducted at ambient temperature or at elevated temperatures, such as greater than 30° C., depending on the chemistries involved.

The catalyst is used in an amount sufficient to enable or accelerate reaction of any reactive functional groups in the reaction mixture. The amount may vary based on the chemistry of the reactants involved, but typically the amount of tri-substituted phosphine used in the method of the present invention is 0.1 to 10 percent by weight, based on the total weight of resin solids in the reaction mixture.

The method of the present invention serves to catalyze a variety of chemical reactions. A number of reaction mixtures are suitable in the method of the present invention. The components of the reaction mixture are typically provided in separate packages and mixed together immediately prior to the reaction, which is often useful for curable compositions. Additionally, in certain embodiments, the reaction mixture may be a powder or liquid curable composition and may be cast, extruded, rolled, or applied to a substrate as a coating or laminated film. The reaction mixture may also yield a transparent reaction product, suitable for use as a free film, display screen, window (glazing), windshield, lens, and the like.

In certain embodiments of the present invention, the reaction mixture may comprise i) a) an isocyanate-functional material and b) a thiol- and/or amine-functional material. In such embodiments, the isocyanate-functional material i) a) may be any isocyanate-functional material, for example, monoisocyanates, and/or polyisocyanates such as diisocyanates and triisocyanates including biurets and isocyanurates. Biurets of any suitable diisocyanate including 1,4-tetramethylene diisocyanate and 1,6-hexamethylene diisocyanate may be used as reactant i) a) in the method of the present invention. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and α,α,α',α'-tetramethylmeta-xylylene diisocyanate. The diisocyanates themselves may also be used as reactant i) a) in the method of the present invention.

Trifunctional isocyanates may also be used as reactant i) a), for example, trimers of isophorone diisocyanate, triisocyanato nonane, triphenylmethane triisocyanate, 1,3,5-benzene triisocyanate, 2,4,6-toluene triisocyanate, an adduct of trimethylol propane and tetramethyl xylene diisocyanate sold under the trade name CYTHANE 3160 by CYTEC Industries, and DESMODUR N 3300, which is the isocyanurate of hexamethylene diisocyanate, available from Bayer Corporation. Polyisocyanates often used in curable compositions include cyclic isocyanates, particularly, isocyanurates of diisocyanates such as hexamethylene diisocyanate and isophorone diisocyanate.

The isocyanate-functional material used as reactant i) a) may also be one of those disclosed above, chain extended with one or more polyamines and/or polyols using suitable materials and techniques known to those skilled in the art.

Suitable thiol-functional materials for use in the reaction mixture include any material having primary and/or secondary thiol groups. The materials may be monomeric, oligomeric, or polymeric, and may be mono- or polyfunctional. Such a reaction mixture will yield thiourethanes. Likewise, suitable amine-functional materials for use in the reaction mixture include any monomeric, oligomeric, or polymeric material having primary and/or secondary amine groups. When reacted with isocyanates in the presence of the tri-substituted phosphine, ureas are formed. Combinations of thiol- and amine-functional materials may also be used in the reaction mixture and will result in the catalyzed formation of thioureas in accordance with the invention.

In alternative embodiments of the present invention, the reaction mixture may comprise ii) a) a uretdione and b) a hydroxyl-, thiol- and/or amine-functional material. The uretdione may be prepared from any two isocyanate-functional materials (most often mono-isocyanates, though multi-functional isocyanates may be used; free isocyanate groups that remain may be capped with, for example, an alcohol), that may be the same as or different from each other. In this embodiment of the present invention, it is believed that the tri-substituted phosphine first reacts with the uretdione to form an intermediate, and then the intermediate reacts with active hydrogen groups on the other reactant in the reaction mixture (hydroxyl, thiol, and/or amine). Thiols and amines can be any of those disclosed above. Suitable hydroxyl-functional materials for use in the reaction mixture include any monomeric, oligomeric, or polymeric material having primary and/or secondary hydroxyl groups, such as monoalcohols, ethylene glycol, propylene glycol, trimethylolpropane, and larger molecules such as oligomeric and/or polymeric monoalcohols and polyols including acrylic polyols, polyether polyols, polyester polyols, polyurethane polyols, and the like.

In other embodiments of the present invention, the reaction mixture may comprise iii) a) an anhydride and b) a hydroxyl-functional material such as any of those disclosed above. The anhydrides may include, inter alia, phthalic anhydride, tetrahydrophthalic anhydride, hexahydrophthalic anhydride, methyl hexahydrophthalic anhydride, chlorendic anhydride, and the like. Polyanhydrides are also suitable for use in the method of the present invention.

In additional embodiments of the present invention, the reaction mixture is essentially free of Michael acceptors and may comprise i) an isocyanate-functional material, such as a polyisocyanate, that is essentially free of oxadiazinetrione rings; and ii) a hydroxyl-functional material, such as a polyol. Suitable isocyanates and alcohols include those disclosed above. In such embodiments, the catalyst may further comprise a tin compound. Examples of suitable tin compounds include dibutyltin oxide, stannous octoate, dibutyl tin dilaurate, dibutyl tin diacetate, dibutyl tin mercaptide, dibutyl tin dimaleate, dimethyl tin diacetate, and/or dimethyl tin dilaurate. Alternatively, both the catalyst and reaction mixture may be essentially free of tin compounds. As used throughout this specification, including the claims, by "essentially free" is meant that if a compound is present in the composition, it is present incidentally in an amount less than 0.1 percent by weight, usually less than trace amounts.

Other particular embodiments include a method of catalyzing a chemical reaction comprising adding a catalyst to a reaction mixture, wherein the catalyst is essentially free of tin compounds and comprises a tri-substituted phosphine having at least one substituent that is an alkyl group, and the reaction mixture is essentially free of Michael acceptors and tin compounds. In such embodiments, the reaction mixture typically comprises i) any isocyanate-functional material such as those disclosed above; and ii) a hydroxyl-functional material; again, such as those disclosed above.

The present invention will further be described by reference to the following examples. The examples are merely illustrative of the invention and are not intended to be limiting. Unless otherwise indicated, all parts are by weight.

EXAMPLES

Example 1

This example demonstrates catalysis of hydroxyl/anhydride coating with trioctylphosphine.

1. Synthesis of Resin 1

A hydroxyl functional resin was synthesized by mixing 45.9 g of methyl methacrylate, 15.19 g of lauryl methacrylate, 14.1 g styrene, 10 g of 2-hydroxy ethylacrylate, 14.81 g hydroxyl polyester acrylate (Tone® M-100 monomer, Dow Chemical Company, Midland, Mich.) in 100 g of n-butyl acetate. 3.64 g of VAZO 67 (DuPont Chemical Company) was used as the initiator for this polymerization.

2. Synthesis of Resin 2

An anhydride functional resin was synthesized by mixing 22.01 g of maleic anhydride, 15.6 g methyl methacrylate, 46.79 g styrene, 15.6 g n-butyl acrylate in 9.52 g of mineral spirits, 35.51 g n-butyl acetate and 54.97 g ethyl 3-ethoxypropanoate (Eastman Chemical Company, Kingsport, Tenn.). 7.83 g of t-butyl peroxy-2-ethylhexanoate was used as the initiator for this polymerization.

A series of formulations was prepared to evaluate the performance of different catalysts. Table 1 lists the formulations.

TABLE 1

Coating formulations for Example 1

| Coating | Resin 1 | Resin 2 | n-butyl acetate | Ethyltriphenyl-phosphonium acid acetate[1] | Dimethyl-cocoamine[2] | Trioctyl-phosphine[3] |
|---|---|---|---|---|---|---|
| 1 | 5 | 3.65 | 1.4 | 0.025 | N/A | N/A |
| 2 | 5 | 3.65 | 1.4 | 0.100 | N/A | N/A |
| 3 | 5 | 3.65 | 1.4 | N/A | 0.025 | N/A |
| 4 | 5 | 3.65 | 1.4 | N/A | 0.100 | N/A |

TABLE 1-continued

Coating formulations for Example 1

| Coating | Resin 1 | Resin 2 | n-butyl acetate | Ethyltriphenyl-phosphonium acid acetate[1] | Dimethyl-cocoamine[2] | Trioctyl-phosphine[3] |
|---|---|---|---|---|---|---|
| 5 | 5 | 3.65 | 1.4 | N/A | N/A | 0.025 |
| 6 | 5 | 3.65 | 1.4 | N/A | N/A | 0.100 |

[1]available from Rohm and Haas Company, a fully owned subsidiary of the Dow Chemical Company
[2]Available from Akzo Nobel Surface Chemistry AB, Stenungsund, Sweden
[3]Available from Cytec Industries Inc., Woodland Park, New Jersey Coatings 1-6 were prepared, drawn down onto cold rolled steel using a 4 mil drawdown bar and the cotton times and gel times were monitored. Cotton time is the amount of time required for a coating to achieve a level of dryness, such that upon the application of a cotton ball, the cotton ball falls off of the applied coating upon inversion of the applied coating. Gel time is the amount of time required for a coating to gel to the extent that it does not flow when the coating container is rotated 90° from normal. König hardness measurements were conducted 24, 144 and 312 hours after coating application. Table 2 lists the data obtained from this experiment.

TABLE 2

| Coating | Cotton time | Gel time | König hardness (24 hr) | König hardness (144 hr) | König hardness (312 hr) |
|---|---|---|---|---|---|
| 1 | 5 min | 1320 min | 168 | 200 | 200 |
| 2 | 4 min 42 sec | 450 min | 187 | 197 | 199 |
| 3 | 7 min | 207 min | 188 | 203 | 205 |
| 4 | 5 min 42 sec | 129 min | 191 | 203 | 205 |
| 5 | 5 min 50 sec | 3092 min | 178 | 188 | 198 |
| 6 | 4 min 50 sec | >480 and <960 min | 177 | 186 | 196 |

The data presented in Table 2 indicate that trioctylphosphine is a suitable catalyst for hydroxyl/anhydride reactions. The cotton times and hardness values are comparable to the other catalysts evaluated, while the gel times are longer on average. A longer gel time is actually beneficial in coatings, as it gives the operator more time to work with the coating before it gels.

Example 2

This example demonstrates blocking of trioctylphosphine in a thiol/isocyanate reaction.

Three coatings were prepared by mixing 6 g of SIKKENS AUTOCLEAR UV (available from Akzo Nobel Car Refinishes, Amsterdam, The Netherlands), which contains pentaerythritol tetrakis(3-mercaptopropionate), with 5 g of a 66% DESMODUR N 3600 (from Bayer Materials Science, Pittsburgh, Pa.) solution in n-butyl acetate. To the first coating was added 0.6 g of a solution containing 20% of a 1:1 molar ratio of propionic acid to trioctylphosphine in xylene. To the second coating was added 1.2 g of a solution containing 20% of a 5:1 molar ratio of propionic acid to trioctylphosphine in xylene. To the third coating was added 1.8 g of a solution containing 20% of a 10:1 molar ratio of propionic acid to trioctylphosphine in xylene. The gel time for the coating containing the 1:1 molar ratio of propionic acid to trioctylphosphine was 15 seconds. The gel time for the coating containing the 5:1 molar ratio of propionic acid to trioctylphosphine was 60 seconds. The gel time for the coating containing the 10:1 molar ratio of propionic acid to trioctylphosphine was 120 seconds. These data indicate that the addition of acid to trioctylphosphine retards the catalytic ability of trioctylphosphine.

Example 3

This example demonstrates catalyzing the reaction between an amine and an isocyanate using trioctylphosphine.

A grind paste containing 334.8 g JEFFAMINE T-5000 (Huntsman Corporation, The Woodlands, Tex.), 248.3 g of an acrylic/aspartate amine curative (see example A of US 2008/0141903 A1), 317.6 g CLEARLINK 1000 (Dorf Ketal Chemicals LLC, Stafford, Tex.), 11.8 g Byk 9077 (Byk-Chemie GmbH, Wesel, Germany), 26.1 g TINUVIN 292 (Ciba Specialty Chemicals, 28.8 g VULCAN XC72 (Cabot Corporation, Billerica, Mich.), 16.3 g CAB-O-SIL M-5 (Cabot Corporation, Billerica, Mich.), 16.3 g CLAYTONE 546 (Southern Clay Products, Inc., Gonzales, Tex.) was mixed using a Cowles blade and then introduced into an Eiger mill charged with TZP plus 1.0 mm grind media. The grind paste was ground until a 7.5 Hegman was achieved and then the mixture was removed from the mill. Table 3 contains 4 formulations prepared using the aforementioned grind paste.

TABLE 3 formulations and data for catalysis of an amine/isocyanate reaction using trioctylphosphine

| Component | Coating A | Coating B | Coating C | Coating D |
|---|---|---|---|---|
| Grind Paste | 76.52 | 76.52 | 76.52 | 76.52 |
| JEFFAMINE T-5000 | 2.3 | 2.0 | 1.8 | 2.0 |
| Acrylic/aspartate amine curative | 20.7 | 20.7 | 20.7 | 20.7 |
| Trioctylphosphine | 0.5 | 0.75 | 1.0 | N/A |
| Dibutyltin dilaurate | N/A | N/A | N/A | 0.75 |
| CAT133[1] | 255 | 255 | 255 | 255 |
| Film thickness (μm) | 52 | 50 | 52 | 51 |
| Tack time (seconds) | 25 | 22 | 20 | 29 |

[1]CAT133 is an isocyanate based catalyst for DURABED and is available from PPG Industries, Inc., Pittsburgh, Pennsylvania Films were drawn down using a draw down bar. Tack free times for films prepared from formulations A, B and C containing trioctylphosphine are 25, 22 and 20 seconds respectively, while the tack time for formulation D containing dibutyltin dilaurate is 29 seconds.

Example 4

This example illustrates catalyzing the reaction between a hydroxyl group and an isocyanate.

An acrylic polyol (acrylic polyol 1) was made by reacting 90.6 g acrylic monomer (made by reacting 395.3 g CARDURA E-10P (Hexion Specialty Chemicals, Columbus, Ohio) with 115.6 g glacial acrylic acid (inhibited) in the presence of 1.21 g zinc 2-ethylhexanoate solution (8% solution in mineral spirits available from Dura Chemicals Inc., Emeryville, Calif.) and 0.09 g p-methoxyphenol), 372.3 g n-butyl methacrylate (inhibited), 455 g methyl methacrylate, 328.6 g styrene, 542.4 g hydroxypropyl methacrylate, 18 g glacial acrylic acid (inhibited) in 222.4 g methyl amyl ketone and 767 g xylene using 9.1 g lauryl mercaptan as a chain transfer agent and 108 g di-tert amyl peroxide and 9 g triphenyl phosphite as initiators. A base formulation listed in Table 4 was used to evaluate the catalysis of hydroxyl/isocyanate reactions.

TABLE 4

Base formulation A

| Component | Base formulation A |
|---|---|
| Acrylic polyol 1 | 34.09 |
| BYK 300[1] | 0.49 |
| EVERSORB 74[2] | 1.27 |
| SANOL LS-292[3] | 1.74 |
| Methyl isobutyl ketone | 13.76 |
| Methyl amyl ketone | 11.75 |

[1]Byk-Chemie GmbH, Wesel, Germany
[2]Everlight Chemical Industrial Corporation, Taipei, Taiwan
[3]Sankyo Lifetech Co., Ltd., Tokyo, Japan Formulations listed in Table 5 were prepared using Base formulation A from Table 4.

TABLE 5

Coatings formulations and properties

| Component | Coating A | Coating B | Coating C | Coating D |
|---|---|---|---|---|
| Base formulation A | 25.34 | 24.4 | 24.82 | 25.27 |
| 10% dibutyltin dilaurate solution | 0 | 0 | 0.26 | 0.53 |
| Trioctylphosphine[1] | 0 | 0.51 | 0.26 | 0 |
| DCX61[2] | 6.98 | 6.72 | 6.84 | 6.96 |
| Cotton time (minutes) | 51 | 48 | 21 | 20 |
| Gel time (minutes) | >6000 | 317 | 160 | 189 |
| König hardness (24 hr)[3] | 19 | 39 | 31 | 28 |

[1]available from Cytec Industries Inc., Woodland Park, New Jersey
[2]isocyanate hardener available from PPG Refinish Products, Strongsville, Ohio
[3]ASTM D 4366

Coatings were prepared and sprayed using a conventional feed spray gun. Coating C containing trioctylphosphine and dibutyltin dilaurate and Coating D containing dibutyltin dilaurate had cotton times of 21 and 20 minutes respectively, while Coating B containing trioctylphosphine and Coating A containing no catalyst had cotton times of 48 and 51 minutes respectively. Coatings B, C and D had gel times of 317, 160 and 189 minutes, while Coating A (with no catalyst) had a gel time which was greater than 6000 minutes. 24 hours after application, König hardness values for Coatings A, B, C and D were 19, 39, 31 and 28. The data presented in Table 5 indicate that trioctylphosphine can act as a catalyst either by itself or as a co-catalyst with dibutyltin dilaurate and tack times, gel times and König hardness values being better than the uncatalyzed control Coating A.

Example 5

This example demonstrates the efficacy of trioctyl phosphine as a catalyst for the reaction of uretdiones with polyols. Three samples of a uretdione/polyol formulation were prepared. Each contained a mixture of:

1. Acrylic Polyol (55.1 Grams) Prepared as Follows:

A reaction vessel equipped with stirrer, thermocouple, condenser and addition funnels equipped with pumps was charged with 269.2 grams (g) of ethyl-3-ethoxy propionate (EktaPro EEP from Eastman Chemical Products), 15.2 g n-butyl acetate and 5.5 g triphenyl phosphite and heated to reflux, about 160° C. Two feeds, identified herein as A and B, were next gradually added to the vessel over a period of three and four hours, respectively, while the contents of the vessel were maintained at reflux conditions. Feed A consisted of a mixture of 548.6 g Tone M-201 (caprolactone methacrylate, available from Dow Chemical Co.), 274.4 g methyl methacrylate and 274.4 g styrene. Feed B consisted of a mixture of 65.8 g Luperox DTA (free radical initiator from Atochem) and 24.3 g n-butyl acetate. After the addition of the two feeds A and B was complete, the addition funnels were rinsed with 30.0 g each of n-butyl acetate and the contents of the vessel were allowed to reflux for 1 hour. Thereafter, heating was discontinued, the contents of the vessel were allowed to cool and 150.0 g n-butyl acetate is added.

The resultant acrylic polyol had a total solids content measured for 1 hour at 110° C. of 65.8 percent by weight; had a peak molecular weight of 6600, a weight average molecular weight of 10,200 and a number average molecular weight of 2016 as determined by gel permeation chromatography utilizing a polystyrene standard; had a Gardner-Holt viscosity of Z; had an acid value of 1.1; has a APHA color of 20; had a weight/gallon of 8.80; and had a hydroxyl value of 83.3.

2. TP30 polyol (10.0 grams, ethoxylated trifunctional trimethylolpropane from Perstorp AB, Sweden)

3. BYK 300 (0.20 grams, polyether-modified dimethylpolysiloxane copolymer from BYK Chemie, Wesel Germany)

4. CRELAN XP2459 (46.8 grams, a cycloaliphatic polyuretdione from Bayer MaterialScience Inc., Pittsburgh Pa.)

5. 47.1 grams of an experimental polyuretdione from Bayer MaterialScience, Inc. (prepared from DESMODUR N3400, 2-ethylhexanol and 2-ethyl-1,3-hexanediol; the solids content was 50% in n-butyl acetate; the uretdione equivalent weight as supplied was 1341)

6. Butyl acetate (14.0 grams)

To one sample was added 1.28 grams of trioctyl phosphine (Cytec Industries Inc., Woodland Park N.J.), to another was added 1.28 grams of proton sponge (N,N,N',N'-tetramethyl-1,8-naphthalenediamine, Sigma-Aldrich Co., St. Louis Mo.). The third was a control with no catalyst. After 5 hours, the formulation catalyzed by trioctyl phosphine had gelled. After 24 hours, both the control and the formulation with proton sponge had not gelled.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of catalyzing a chemical reaction comprising adding a catalyst to a reaction mixture, wherein the catalyst comprises a tri-substituted phosphine that is blocked with an acid and has at least one substituent that is an alkyl group, and wherein the reaction mixture is essentially free of Michael acceptors and the reaction mixture comprises:
   i) an isocyanate-functional material that is essentially free of oxadiazinetrione rings; and
   ii) a hydroxyl-functional material.

2. The method of claim 1, wherein the tri-substituted phosphine is trioctyl phosphine.

3. The method of claim 1, wherein the catalyst further comprises a tin compound.

4. The method of claim 1, wherein the catalyst and the reaction mixture are essentially free of tin compounds.

5. The method of claim 1, wherein the reaction mixture is a powder or liquid curable composition that is capable of being cast, extruded, rolled, or applied to a substrate as a coating or laminated film.

6. The method of claim 5, wherein the reaction mixture yields a transparent reaction product.

7. A method of catalyzing a chemical reaction comprising adding a catalyst to a reaction mixture, wherein the catalyst is essentially free of tin compounds and comprises a tri-substituted phosphine that is blocked with an acid and has at least one substituent that is an alkyl group, and the reaction mixture is essentially free of Michael acceptors and tin compounds, and the reaction mixture comprises:
   i) an isocyanate-functional material; and
   ii) a hydroxyl-functional material.

8. The method of claim 7, wherein the tri-substituted phosphine is trioctyl phosphine.

9. The method of claim 7, wherein the reaction mixture is a powder or liquid curable composition that is capable of being cast, extruded, rolled, or applied to a substrate as a coating or laminated film.

10. The method of claim 9, wherein the reaction mixture yields a transparent reaction product.

11. A curable composition comprising:
   a) a reaction mixture comprising:
      i) a polyisocyanate; and
      ii) a polyol; and
   b) a catalyst comprising a tri-substituted phosphine that is blocked with an acid and has at least one substituent that is an alkyl group; wherein the polyisocyanate is essentially free of oxadiazinetrione rings, and the reaction mixture is essentially free of Michael acceptors.

12. A curable composition comprising:
   a) a reaction mixture comprising:
      i) a polyisocyanate; and
      ii) a polyol; and
   b) a catalyst, wherein the catalyst is essentially free of tin compounds and comprises a tri-substituted phosphine that is blocked with an acid and has at least one substituent that is an alkyl group, and the reaction mixture is essentially free of Michael acceptors and tin compounds.

* * * * *